(12) United States Patent
Schwarzhaupt et al.

(10) Patent No.: US 8,768,566 B2
(45) Date of Patent: Jul. 1, 2014

(54) VEHICLE HAVING ACTIVE BLIND SPOT LIGHTING AND METHOD

(75) Inventors: Andreas Schwarzhaupt, Landau (DE); Istvan Vegh, Karlsruhe (DE); Urs Wiesel, Ludwigshafen (DE); Jan Wirnitzer, Lorch (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/496,051

(22) PCT Filed: Sep. 2, 2010

(86) PCT No.: PCT/EP2010/005397
§ 371 (c)(1),
(2), (4) Date: Apr. 10, 2012

(87) PCT Pub. No.: WO2011/032646
PCT Pub. Date: Mar. 24, 2011

(65) Prior Publication Data
US 2012/0191298 A1 Jul. 26, 2012

(30) Foreign Application Priority Data
Sep. 15, 2009 (DE) .......................... 10 2009 041 557

(51) Int. Cl.
*G08G 1/16* (2006.01)

(52) U.S. Cl.
USPC .............. 701/36; 701/300; 701/301; 348/148

(58) Field of Classification Search
None
See application file for complete search history.

(56) References Cited

U.S. PATENT DOCUMENTS

| | | | |
|---|---|---|---|
| 5,963,127 A | 10/1999 | Lang et al. | |
| 6,133,851 A | 10/2000 | Johnson | |
| 7,049,945 B2 * | 5/2006 | Breed et al. | 340/435 |
| 7,377,675 B2 * | 5/2008 | Pastrick et al. | 362/494 |
| 7,791,458 B2 * | 9/2010 | Shimaoka et al. | 340/435 |
| 8,125,325 B2 * | 2/2012 | Liou | 340/461 |
| 8,183,991 B2 * | 5/2012 | Yagi et al. | 340/435 |
| 8,262,268 B2 * | 9/2012 | Pastrick et al. | 362/494 |
| 2004/0114384 A1 * | 6/2004 | Carter et al. | 362/494 |
| 2004/0148057 A1 * | 7/2004 | Breed et al. | 700/242 |
| 2004/0230358 A1 * | 11/2004 | Stam et al. | 701/49 |
| 2007/0179712 A1 * | 8/2007 | Brandt et al. | 701/300 |

(Continued)

FOREIGN PATENT DOCUMENTS

| | | |
|---|---|---|
| DE | 296 17 413 U1 | 1/1997 |
| DE | 10 2006 002 232 A1 | 7/2007 |

(Continued)

OTHER PUBLICATIONS

Martijn Tideman et al., A Simulation Environment for Developming Intelligent Headlight Systems, Jun. 21-24, 2010, Intelligent Vehicles Symposium (IV), 2010 IEEE, pp. 225-231.*

(Continued)

*Primary Examiner* — Behrang Badii
*Assistant Examiner* — Demetra Smith-Stewart
(74) *Attorney, Agent, or Firm* — Crowell & Moring LLP

(57) ABSTRACT

In order to provide better monitoring for the side environment of a vehicle a lighting unit to light up a vehicle environment and a detection unit for detecting an object in the vehicle environment are provided. The lighting unit is automatically switched on if the detection unit has detected an object in the vehicle environment.

17 Claims, 7 Drawing Sheets

(56) References Cited

U.S. PATENT DOCUMENTS

| | | | |
|---|---|---|---|
| 2007/0182528 A1* | 8/2007 | Breed et al. | 340/435 |
| 2007/0291000 A1* | 12/2007 | Liang et al. | 345/161 |
| 2008/0219019 A1* | 9/2008 | Pastrick et al. | 362/494 |
| 2009/0010494 A1* | 1/2009 | Bechtel et al. | 382/104 |
| 2012/0105638 A1* | 5/2012 | Englander | 348/148 |
| 2012/0154785 A1* | 6/2012 | Gilliland et al. | 356/5.01 |
| 2013/0250112 A1* | 9/2013 | Breed | 348/148 |

FOREIGN PATENT DOCUMENTS

| | | |
|---|---|---|
| DE | 10 2006 007 173 A1 | 8/2007 |
| GB | 2 366 462 A | 3/2002 |
| JP | 2006-044359 A | 2/2006 |
| JP | 2008-44359 A | 2/2008 |
| WO | WO 00/26684 A2 | 5/2000 |

OTHER PUBLICATIONS

International Search Report with English translation dated Dec. 3, 2010 (five (5) pages).

Forms PCT/ISA/220 and PCT/ISA/237 dated Dec. 3, 2010 (seven (7) pages).

Japanese Office Action with English translation thereof dated Jul. 17, 2013 {Three (3) pages}.

* cited by examiner

VEHICLE HAVING ACTIVE BLIND SPOT LIGHTING AND METHOD

BACKGROUND AND SUMMARY OF THE INVENTION

The present invention relates to a vehicle with a lighting unit for illuminating a vehicle environment and a detection unit for detecting an object in the vehicle environment. In addition the present invention relates to a method for operating a vehicle by illuminating a vehicle environment through a lighting unit and detecting an object in the vehicle environment.

Many vehicle manufacturers currently offer monitoring systems that observe the direct environment of the vehicle. One of the most well-known ultrasound-based systems is—predominantly in the motor car field—the so-called parking assistance or Parktronic® system. This works with a total of ten ultrasound sensors arranged on the front and rear of the vehicle.

For the field of heavy goods vehicles, the MAN company has constructed an ultrasound-based start-up warning system, which is described, for example, in German Patent Document DE 10 2006 002 232 A1. This system covers, with approximately 10 sensors, the front corner of the cab of the vehicle. It works, however, only when standing and emits a warning only upon falling below a previously stored reference distance during start-up. This system has serious disadvantages as the detection region is greatly focused on a small region beside the cab and furthermore a warning occurs only when starting up from a standstill. Due to the system arrangement this system furthermore does not allow blind spot monitoring beside the vehicle.

German Patent Document DE 10 2006 007 173 A1 discloses a vehicle environment detection system for detecting objects approaching the side of the vehicle. A blind spot radar sensor detects a blind spot region lying to the side beside the vehicle. This intersects with the detection region of a front radar sensor.

German Patent Document DE 296 17 413 U1 describes a monitoring unit for zones around motor vehicles that are difficult to see or cannot be seen. A sensor and a warning display of the monitoring unit work only in a speed range between vehicle standstill and a predefined threshold speed.

Blind spot assistants or turning assistants typically detect obstacles located to the side of the vehicle (e.g., cyclists or pedestrians beside a heavy goods vehicle stopping at traffic lights). The heavy goods vehicle driver can often not see or only have a limited ability to recognize these obstacles in the mirror when it is dark. Cyclists and pedestrians are frequently not aware of the danger of such a situation.

Accordingly, exemplary embodiments of the present invention provide better monitoring of the side environment of a vehicle.

In accordance with the present invention, a vehicle is provided with a lighting unit for illuminating the environment of a vehicle and a detection unit for detecting an object in the vehicle environment. The lighting unit is automatically switched on if the detection unit has detected an object in the vehicle environment.

In accordance with an exemplary method, a vehicle environment is lit by a lighting unit and an object in the vehicle environment is detected. The lighting unit is automatically switched on if an object is detected in the vehicle environment.

The vehicle environment is preferably a blind spot region, i.e., an area that cannot be seen by the vehicle driver in spite of rear mirrors. It can further be advantageous if the lighting unit is arranged on the passenger side of the vehicle. Furthermore an assistance unit can be provided in the vehicle that records a signal of the detection unit and at least one further vehicle signal (e.g., for turning, starting up, lane change and similar) and controls the lighting unit in dependence upon the recorded signals.

In a special embodiment the lighting unit is switched on unconditionally if the detection unit detects a moving object in the vehicle environment. According to a further aspect the lighting unit is only switched on upon detection of a stationary object by the detection unit when the stationary object also lies in a travel path of the vehicle estimated by a vehicle-internal computing unit. It can additionally be advantageous that the lighting unit is automatically switched on if a reverse gear of the vehicle is engaged and driving lighting of the vehicle is switched on.

BRIEF DESCRIPTION OF THE DRAWING FIGURES

The present invention will now be described in more detail by reference to the attached drawings, in which.

DETAILED DESCRIPTION

The embodiments shown in more detail below constitute preferred embodiments of the present invention.

In a concrete example a vehicle can be equipped with an ultrasound-based system that monitors both the front and the side region of the vehicle. The side environment detection should take place in the whole speed range, whereby, besides the turning support from travel, a blind spot monitoring can also occur. Using the sensors constructed along the vehicle front, warnings are can be provided for objects that at the time of start-up are located in the area of danger of the vehicle. The area of danger to the front is defined by the region that cannot be seen by the driver. This generally consists of a distance of 2 m around the vehicle.

Figure 1:
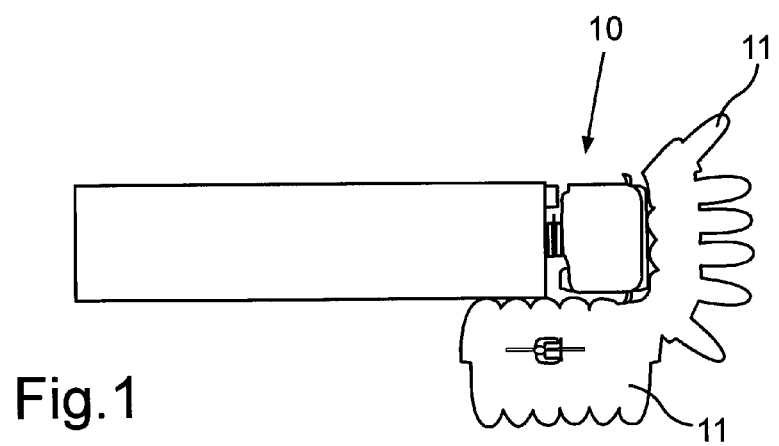
FIG. 1 shows sensor positions on the vehicle.

The ultrasound sensors are arranged according to FIG. 1 on the vehicle 10 so that the detection regions 11 cover the whole region from the left front vehicle corner to the right to the rear axle. The vehicle 10 constitutes the towing vehicle of an articulated truck here. The vehicle 10 is controlled to the left so that a so-called blind spot results on the right side. With right controlled vehicles the sensors are correspondingly located on the left longitudinal side (passenger side) of the vehicle 10.

For blind spot monitoring, sensors with a horizontal opening angle (FOV) of 60° are suitable. Under these preconditions, for example, twelve sensors suffice for covering the monitoring region. FIG. 1 shows the possible arrangement of the sensors and the approximate detection region 11.

Figure 2:
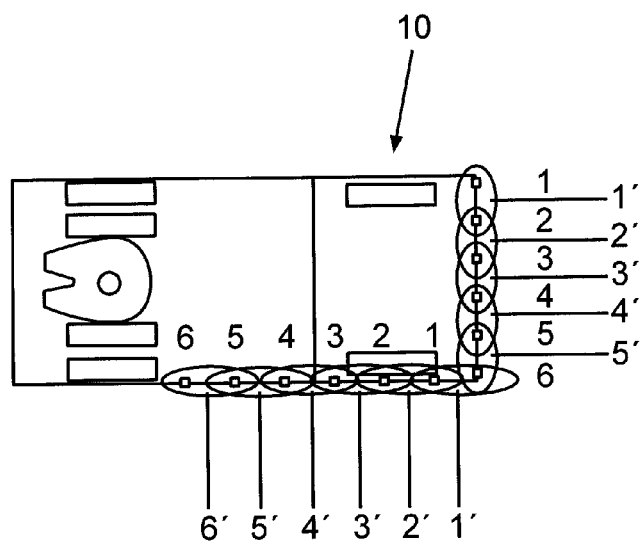
FIG. 2 is a sketch of the total formation of the sensor distances.

Ultrasound sensors detect the echoes reflected back from the object in the detection region, whereby the distance can be calculated depending upon the sound speed and the duration of the signal sent until receipt of the echo. The reflection property of the objects determines the stability of the signals received and thus also the constancy of the distances determined. A diffuse object generates a weak signal that is unstable in the distance determination. This usually leads to the cycle time of the distance measurement having to be increased. In order to obtain a stable distance indication without a cycle time increase the sensor signals are to be subjected to a sliding sum formation as illustrated in FIG. 2. One thereby assumes that an object is covered by a plurality of sensors, and thus a plurality of sensors simultaneously provide a result. FIG. 2 shows on the front side of the vehicle 10 and on the passenger side of the vehicle 10 respectively six sensors (small box symbols) that are identified by reference numerals 1 to 6. The sensors on the passenger side extend virtually over the whole length of the vehicle 10, and in particular with their detection region as far as the rear axle of the vehicle. The sliding connection of the sensors consists in that their signals are added in pairs. In particular, the signals of adjacent sensors are summed to form the sensor signals 1', 2', ... 6'. Through such a sliding sum formation of the sensor distances an improvement in the stability of the distance output can be achieved without increasing the cycle time.

In a further developed embodiment a speed-dependent coverage range limitation is provided. As the system is intended support turning and to monitor the blind spot region, it is necessary to specify the warning regions beside the vehicle. An ultrasound sensor typically has an effective coverage range of approximately 2.5 m. This coverage range must be configured both for the turning/start-up assistant and for the blind spot assistance function so that the driver is constantly informed, but is troubled as little as possible by lasting acoustic warnings. For this, the target speed-dependent dynamic coverage range limitation is used. In order to always be able to give the driver an optimal indication concerning the environment of the vehicle a three-stage optical warning is coupled for example with the dynamic coverage range limitation. The last stage of the warning cascade is constituted by the switching on of an acoustic sound emitter that provides notice of impending collisions.

Figure 3:
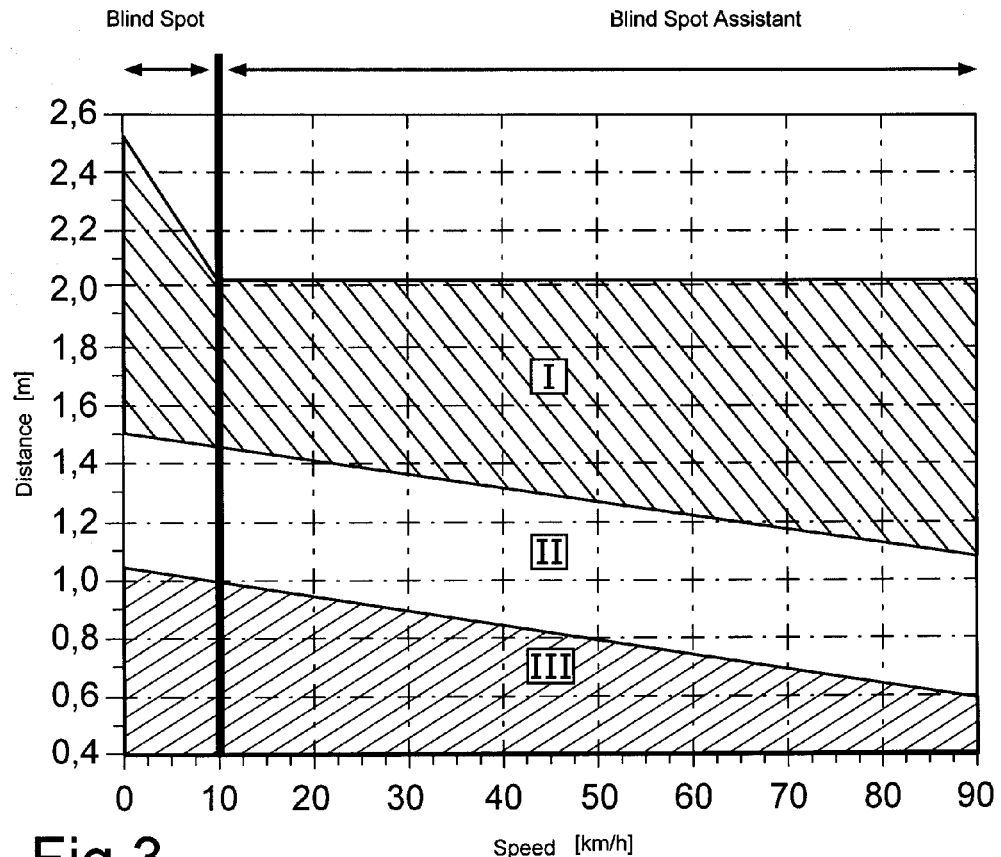
FIG. 3 illustrates a dynamic coverage region determination.

Possible warning regions and the functioning of the dynamic coverage range limitation are shown in FIG. 3. For the coverage range limitation two regions are differentiated here. Below a speed of 10 km/h (a different threshold can also be selected) a turning assistant is defined here and above this speed threshold a blind spot assistant. In a first warning region I (external detection region) defined by a speed-dependent distance function, a yellow warning signal is output for example. In a second warning region II (middle detection region) an orange warning signal for example is output and in a third warning region III for example a red warning signal is output. The coverage ranges of the individual warning regions I to III are speed-dependent. The warning region I extends at a standstill as far as a distance of 2.5 m. In case of a speed of 10 km/h the coverage range only reaches 2.0 m. For the blind spot assistant, i.e., over a speed of 10 km/h, the coverage range of the warning region I is maintained constant here. In contrast, the coverage ranges of the warning regions II and III decrease linearly with increasing speed independently of the speed threshold separating the turning assistant from the blind spot assistant. The coverage ranges of the different warning regions can thus be dynamically realized with different functions (in the whole speed range or from warning region to warning region).

An example warning concept includes the above-described dynamic coverage range limitation and the recognition of the driver's intention concerning turning, start-up and lane change via various vehicle characteristic values. An optical/acoustic warning is to be triggered only in case of a combination of an object in the danger region with a detected driver's wish. The coverage range limitation shown in FIG. 3 is also divided into two functionally separated regions. Below 10 km/h the coverage range of the sensors is the greatest. According to experience, the turning process takes place in this speed range. The start-up process—it is thereby irrelevant whether the driver wishes to turn or not—is also covered for the front monitoring, but the effective warning concepts for the turning and pure start-up process without a wish to turn are different.

Figures 4, 5:
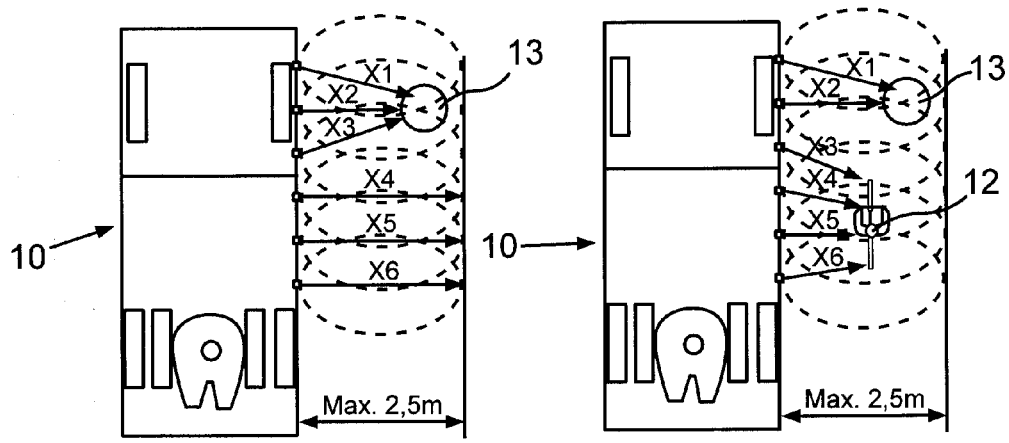
FIGS. 4 and 5 illustrate a grid formation for position determination of an object with ultrasound sensors.

The warning concept at a standstill provides for a differentiation between moving objects 12 and stationary objects 13 (cf FIGS. 4 and 5). This takes place according to the following equation by summing up all lateral distance values:

$$A = \sum_{n=1}^{6} X_n$$

When the vehicle 10 is at a standstill the sum of all detected distances (X1 to X6) is determined and stored. If merely one stationary object 13 according to FIG. 4 is in the coverage range of the sensors the determined distance remains constant. If according to FIG. 5 an object 12 travels into the warning region the sum of the distances X1 to X6, which is to be interpreted as an indication of a moving object, changes.

In order to recognize whether a moving object 12 has penetrated the detection region the following condition must be fulfilled:

$$\left(A = \left(\sum_{n=1}^{6} X_n\right)_{t-1}\right) \ge \left(B = \left(\sum_{n=1}^{6} X_n\right)_{t}\right)$$

Figure 6:
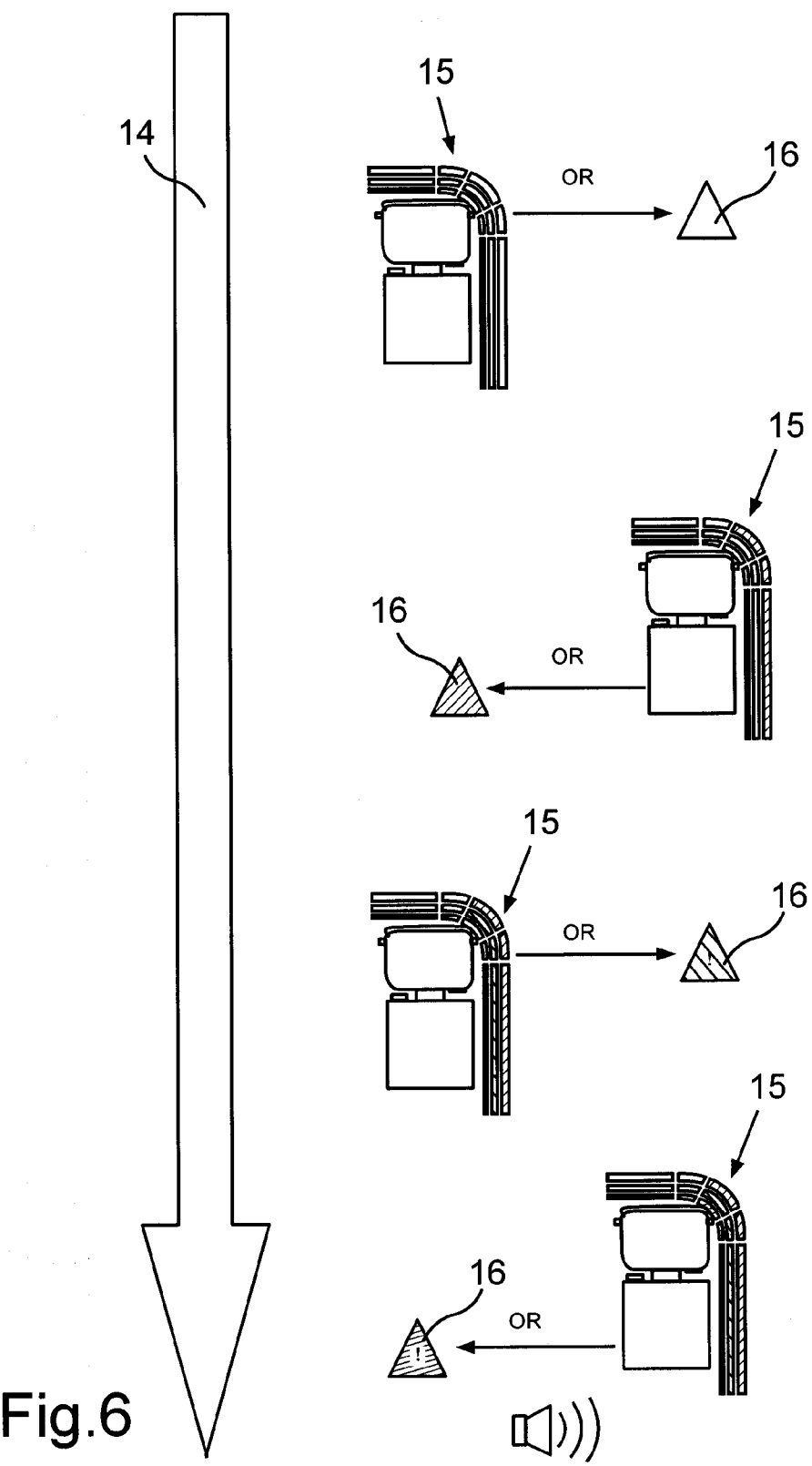
FIG. 6 is a sketch of the correlation between distance, driver's wish, criticality and warning stage.

With a combination of distance, travel direction wish and start-up wish, depending upon criticality, there can be a warning in three stages (FIG. 6). The criticality increases in the direction indicated with the arrow 14. The warning stage is optically or acoustically output in dependence upon the distance, driver's wish and criticality. A segmented display 15 integrated for example in the instrument cluster (vehicle symbol with monitoring region) or a general display 16 (e.g. triangle) can be used. If, as shown in FIG. 6 at the top, there is no object in the coverage range of the sensors or the blind spot assistance unit, there is a non-critical situation and the warning instruments 15, 16 output a signal.

If there is an object in the coverage range of the sensors, but its distance is greater than 2 m and no travel direction wish has been expressed by the driver, the warning unit or warning display can provide information in this regard. This situation corresponds to the second symbols from the top in FIG. 6. The triangle 16 lights up yellow for example or the outer segments of the segmented display 15 light up yellow.

The criticality of a situation increases further if the object is located in the coverage range of the sensors and the distance lies in the warning region II (cf FIG. 3) but no travel direction wish has been expressed by the driver. The same criticality, which requires increased attention, is achieved if the distance of the object from the vehicle does indeed amount to more than 2 m but a travel direction change is indicated or determined. In this case, according to the third representation from the top in FIG. 6, for example, in addition to the yellow outer segments, the middle segments of the segmented display 15 also light up orange. Alternatively, the triangle display 16 can also light up orange for example and indicate an exclamation mark.

The most critical case, in which there is a direct risk of accident, is given if the object is in the coverage range of the sensors and indeed within the warning region III (cf FIG. 3), a travel direction wish is indicated or determined and a start-up is present. In this case the triangle display 16 lights up red or the segmented display 15 additionally lights up red in its innermost region. In addition an acoustic warning signal can be reproduced.

In general for blind spot monitoring at a standstill the red warning is output with acoustic sound only with closer lying objects with travel direction change wish and start-up wish. The first optical display stage is merely an indication that there is an object in the monitoring region of the sensors.

Figure 7:
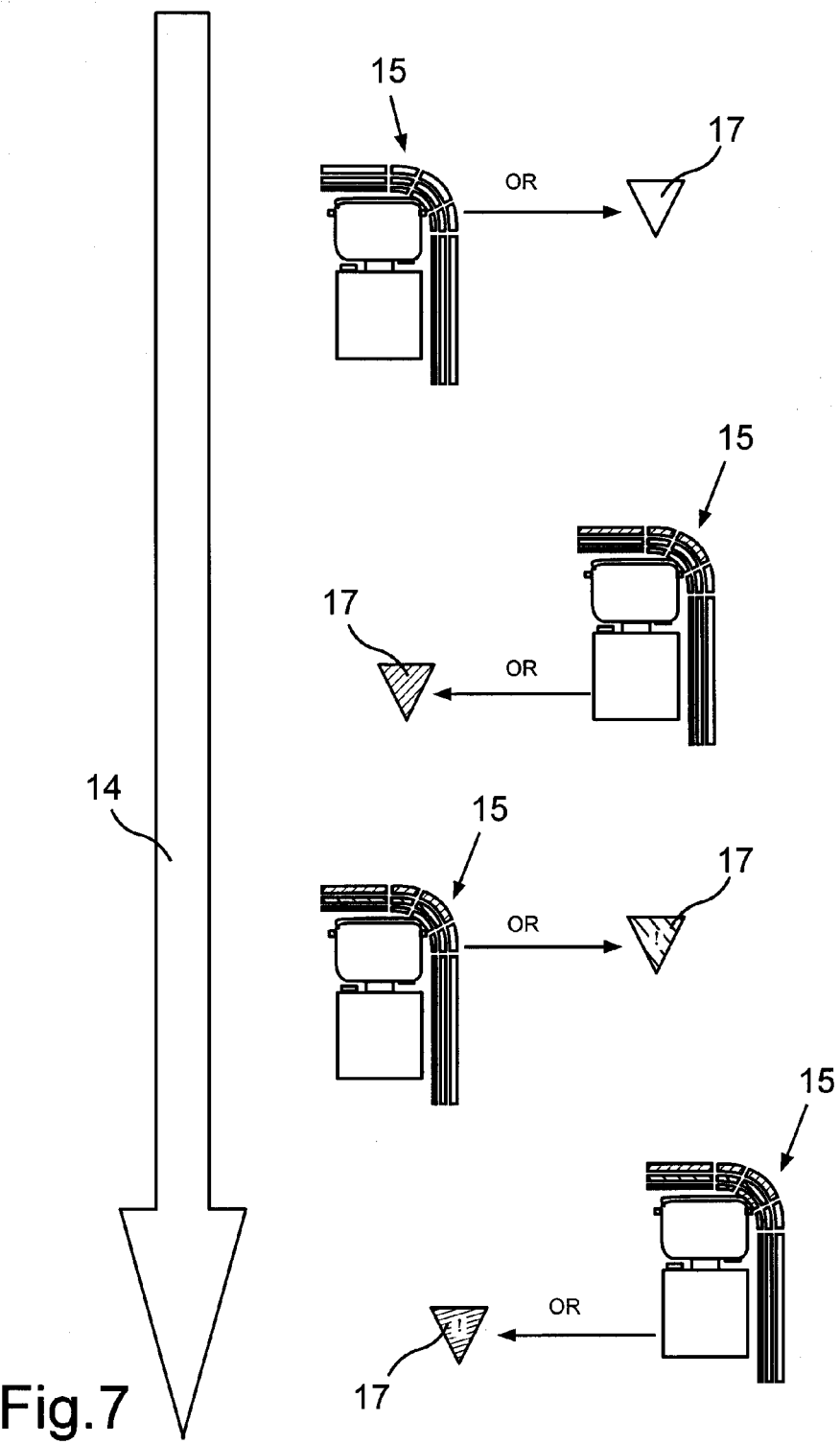
FIG. 7 illustrates a warning concept for front monitoring during start-up.

Additionally, during start-up the front region of the vehicle is monitored, as shown in FIG. 7. If there is an object in this region, of which the coverage range is not adapted to the region that can be seen (approximately 2 m in distance), an optical display (e.g., yellow or orange) can be produce according to criticality (i.e., proximity to the vehicle). If the vehicle wishes to start up the actual warning is output in the form of an optical/acoustic display. The warning concept can be implemented with the segmented display 15, which is already known from the example of FIG. 6, or for example with another triangle display 17 (possibly also with the same triangle display 16). In the example of FIG. 7 a triangle standing on its tip is used for the front monitoring. The respectively used display can also be integrated into a instrument cluster. The warning stages result similarly to the example of FIG. 6, wherein the object is in a blind spot in front of the vehicle here.

In addition to the start-up warning to the front, the distances can be displayed in the maneuvering operation—similarly to the case of Parktronic® in motor cars. An optical/acoustic warning is output when falling below a defined minimum distance. The display of the distances can take place via a conventional LED display or in the instrument cluster through a representation of the smallest distance from the object.

The sliding individual distances (cf FIG. 2) are used during travel. The speed-dependent distances, shown in FIG. 3, for evaluating the criticality and triggering of the optical displays are thereby used. An acoustic warning is only output when a travel direction change is recognized and simultaneously an object has been detected very close to the vehicle. Travel direction change can be in a simple embodiment a set flashing signal, in an extended embodiment the vehicle movement in lane direction or the predicted likely vehicle movement direction, derived from the steering wheel angle and yaw rate information, or a combination thereof. A further design of the side space monitoring is the support for lane change or during (re-) joining the right lane.

Figure 8:
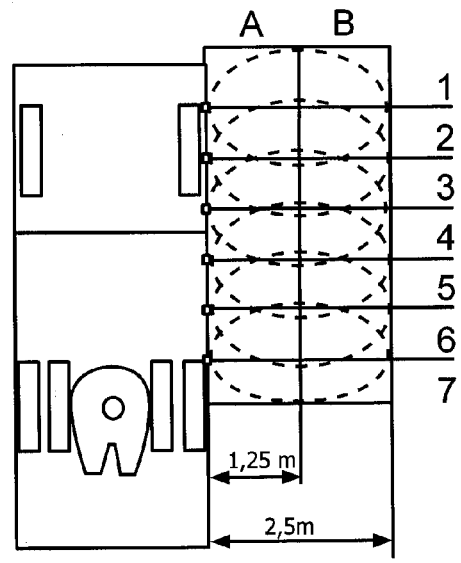
FIGS. 8 and 9 illustrate a grid formation for position determination of an object with ultrasound sensors.
Figure 9:
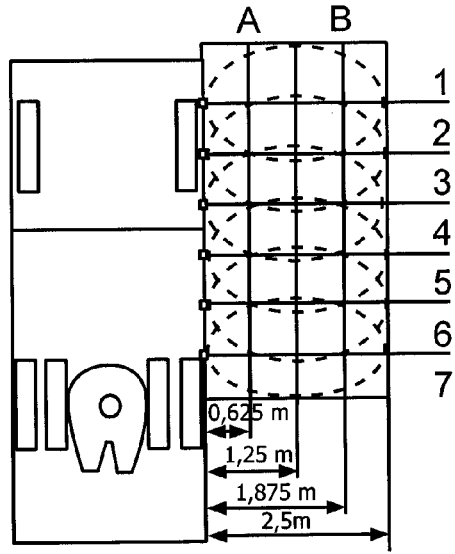

A further embodiment of the system can provide that a relative position of the object is approximately determined in relation to the vehicle. As shown in FIGS. 8 and 9, grids are provided over the sensor detection regions. In this case, for example, two resolution variants can be defined. In the example of FIG. 8 only two different lateral distance regions A and B are defined, while in the example of FIG. 9 four different lateral distance regions A to D are defined. In case of six sensors in the longitudinal direction there are then seven different longitudinal detection regions which extend from the front to the rear axis. The two (possibly also more) variants of FIG. 8 and FIG. 9 can be combined with each other according to the determined criticality. The closer an object lies the more interesting is the most exact position possible.

Figure 10:
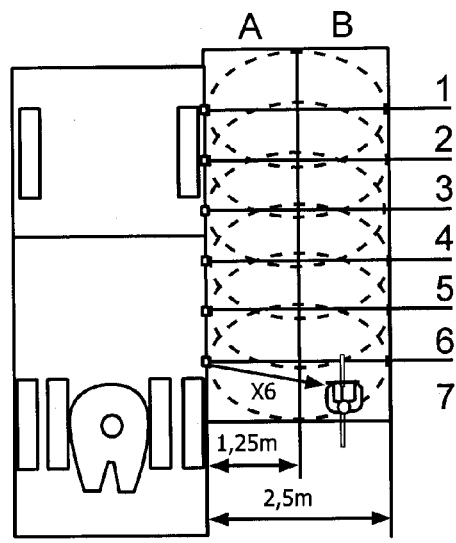
FIGS. 10 and 11 are sketches for determining the relative position of an object.
Figure 11:
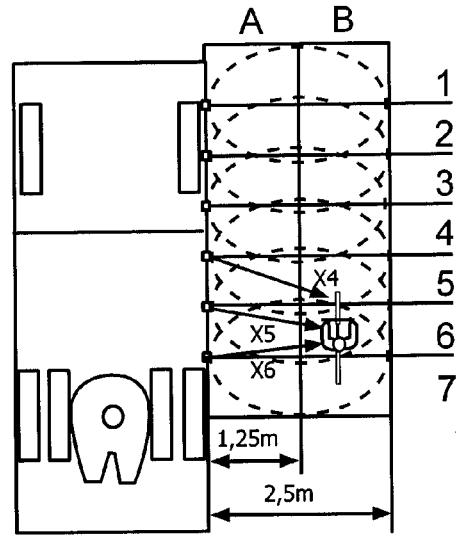

If an object 12 according to FIG. 10 lies in the coverage range of the rearmost sensor the latter produces a corresponding echo, which can be assigned in dependence upon the distance (X 6) and the distance feedback of the other sensors at least to a rough (or finer) grid. In the example of FIG. 10, the object 12 is assigned to the grid B7. If the object 12 travels further according to FIG. 11 further sensors deliver corresponding distance signals X4, X5 and X6. The object is thereby assigned to further grids B5, B6 and B7. These grids are transferred to the warning device or the warning algorithm as object positions.

Figure 12:
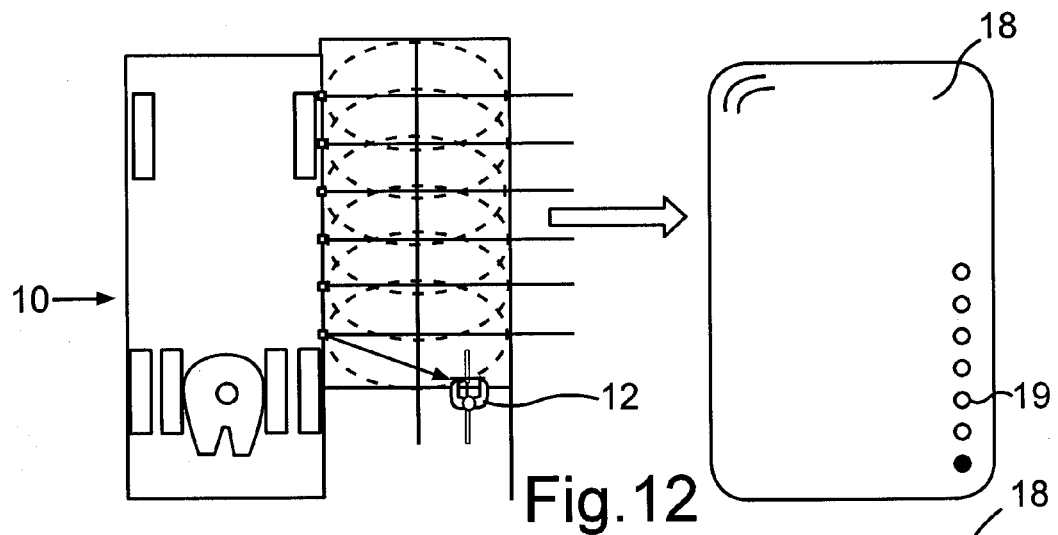
FIGS. 12 to 14 are sketches for determining the position of an object in a mirror.
Figure 13:
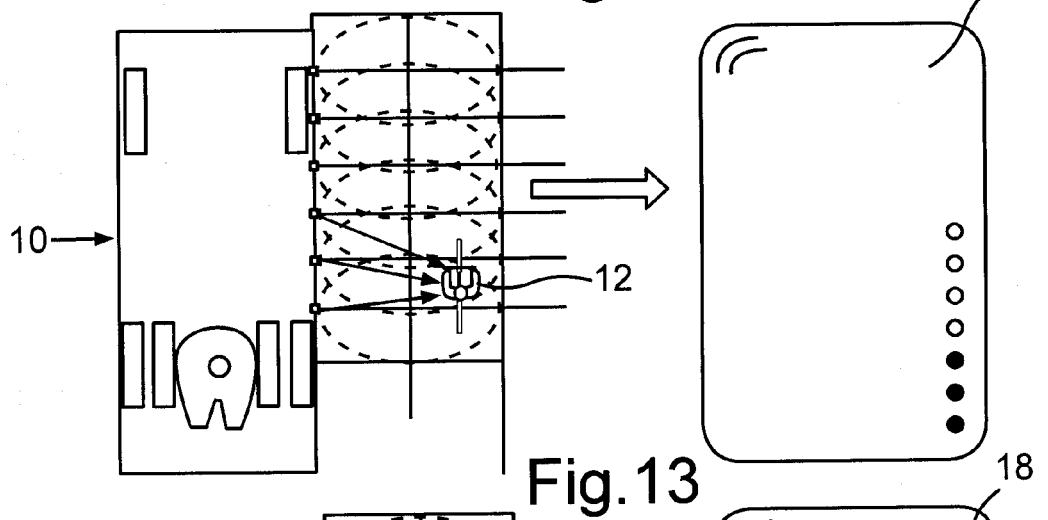
Figure 14:
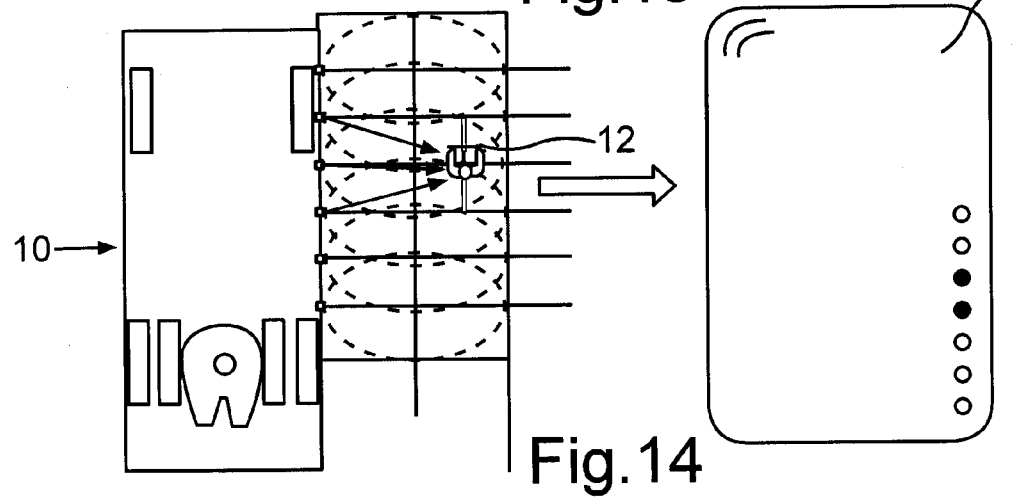

In addition to the warning and the distance, a further inventive embodiment of the system involves displaying the determined position of the object in a cost-effective LED display or in another suitable display medium. This can preferably be an outer mirror or an instrument cluster. FIGS. 12 to 14 show a possible embodiment. According to FIG. 12 the object 12 is in the rearmost external detection grid. This is indicated in the outer mirror 18 in that, of seven LEDs 19 arranged in series one behind the other, the last one lights up. If the object 12 according to FIG. 13 is in the last three grids this is indicated with the LED series 19 by illuminating the last three LEDs. If the object 12 travels further and is now in the grids 3 and 4, the third and fourth LED in the outer mirror 18 light up correspondingly. The proximity of the object 12 to the vehicle 10 can possibly be indicated by a characteristic warning color. With the aid of the approximate object position the warning concept to date can be reduced and used purposefully.

The conventional use of ultrasound sensors has been limited merely to assistance during parking. Through the inventive side arrangement of the sensors, however, a blind spot assistant can now be realized. The system can thereby provide support both during turning and from standstill as well as during travel. A further embodiment of the system is the blind spot monitoring directly beside the vehicle in the whole speed range. This results in a certain lane change support when switching to the right lane. In addition the system warns—as has been shown—when starting up in front of objects which are directly in front of the vehicle in the region which cannot be seen by the driver. A further development could also consist in that an automatic active engagement takes place in dangerous situations, whereby in case of impending collisions for example the brake is controlled or the start-up suppressed so long until the object moves out of the danger zone. Furthermore using the front sensors a type of maneuvering assistance with distance input can be realized. Furthermore the system can offer a rough location of the objects which can be shown in grids, whereby the warning concept can be refined.

Figure 15:
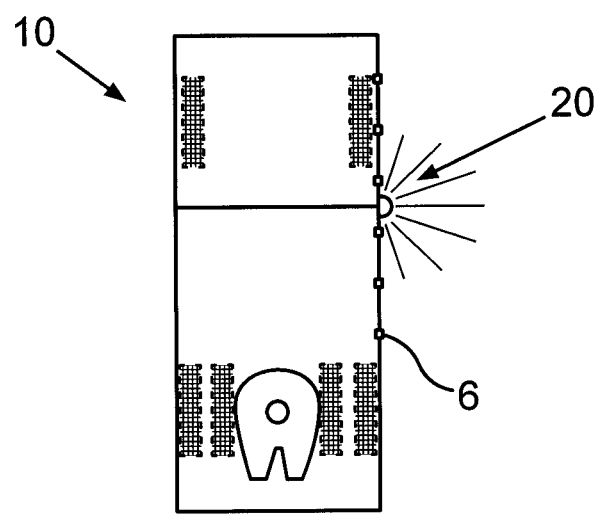
FIG. 15 illustrates a vehicle with side lighting.

FIG. 15 shows a vehicle with a plurality of sensors arranged on the right side, of which for the sake of an overview merely the rearmost one is provided with the reference numeral 6. The sensors serve to monitor a blind spot region on the passenger side of the vehicle 10. Obviously the vehicle 10 can also be equipped on the front side with sensors, as is the case in the example of FIG. 2. Essential to this example is only that a lighting unit 20 is arranged on the passenger side, on which the blind spot region is produced. The lighting unit 20 is preferably a headlight which can light up the blind spot region.

If an object is detected with the aid of the detection unit, i.e., the sensors 1 to 6, a blind spot/turning assistant integrated into the vehicle 10 switches on the lighting element 20. For example, a cyclist can be lit up beside the heavy goods vehicle with the laterally arranged headlight so that the driver can see him better in the mirror.

The lighting unit 20 can be switched on and off according to similar criteria, as output by the warning signals of the above-described warning system. For example, the switching on and switching off of the lighting unit can take place depending upon the speed in a similar manner to that discussed above with regard to FIG. 3. In addition, a switching on of the lighting unit 20 can also be controlled so that with a movable object in the detection region it is always switched on, while in case of a stationary object in the detection region it is only switched on if the object (possibly with a safety distance) is located in a driving path of the vehicle 10 which has been previously calculated or estimated.

The lighting unit arranged laterally on the heavy goods vehicle or vehicle 10 can possibly also be used for maneuvering. The lighting unit 20 (headlight) is hereby switched on for example when the reverse gear is engaged and the lighting is switched on.

Accidents with heavy goods vehicles can be clearly reduced in their blind spot regions with the inventive system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A vehicle, comprising:
   a lighting unit configured to illuminate a vehicle environment;
   a detection unit configured to detect an object in the vehicle environment;
   an assistance unit configured to record a signal of the detection unit and at least one additional vehicle signal and to control the lighting unit depending upon the signal of the detection unit and the at least one additional vehicle signal; and
   a warning system that warns a user of the vehicle about the object based upon a plurality of speed-dependent warning regions;
   wherein the lighting unit is configured to automatically switch on if the detection unit has detected the object in the vehicle environment.

2. The vehicle according to claim 1, wherein the vehicle environment is a blind spot region.

3. The vehicle according to claim 1, wherein the lighting unit is arranged on a passenger side of the vehicle.

4. The vehicle according to claim 1, wherein the lighting unit is configured to switch on unconditionally if the detection unit detects a moving object in the vehicle environment.

5. The vehicle according to claim 1, wherein the lighting unit is configured to switch on upon detection of a stationary object through the detection unit only when the stationary object also lies in a travel path of the vehicle that is estimated by a vehicle-internal computing unit.

6. The vehicle according to claim 1, wherein a coverage range of the detection unit decreases as vehicle speed increases between zero and a first threshold speed in the plurality of warning regions.

7. The vehicle according to claim 6, wherein the coverage range of the detection unit remains constant when the vehicle speed is greater than the first threshold speed in a first warning region of the plurality of warning regions.

8. The vehicle according to claim 7, wherein, when the vehicle speed is greater than the first threshold speed in a second warning region and a third warning region of the plurality of warning regions, the coverage range of the detection unit decreases as the vehicle speed increases.

9. The vehicle according to claim 1, wherein the plurality of speed-dependent warning regions are defined by a speed of the vehicle and a distance of the object from the vehicle.

10. The vehicle according to claim 9, wherein a first warning is provided to the user in a first speed-dependent warning region of the plurality of speed-dependent warning regions, a second warning is provided to the user in a second speed-dependent warning region of the plurality of speed-dependent warning regions, and a third warning is provided to the user in a third speed-dependent warning region of the plurality of speed-dependent warning regions, wherein the first, second, and third warnings are different from each other.

11. The method according to claim 1, wherein the plurality of speed-dependent warning regions are defined by a speed of the vehicle and a distance of the object from the vehicle.

12. The method according to claim 11, wherein a first warning is provided to the user in a first speed-dependent warning region of the plurality of speed-dependent warning regions, a second warning is provided to the user in a second speed-dependent warning region of the plurality of speed-dependent warning regions, and a third warning is provided to the user in a third speed-dependent warning region of the plurality of speed-dependent warning regions, wherein the first, second, and third warnings are different from each other.

13. A method for operating a vehicle, the method comprising:
   illuminating a vehicle environment by a lighting unit;
   detecting an object in the vehicle environment by a detection unit;
   recording a signal of the detection unit and at least one additional vehicle signal;
   controlling the lighting unit depending upon the signal of the detection unit and the at least one additional vehicle signal; and
   warning a user of the vehicle about the object based upon a plurality of speed-dependent warning regions;
   wherein the lighting unit is automatically switched on if the object is detected in the vehicle environment.

14. The method according to claim 13, wherein the lighting unit is automatically switched on if a reverse gear of the vehicle is engaged and driving lighting of the vehicle is switched on.

15. The method according to claim 13, wherein a coverage range of the detection unit decreases as vehicle speed increases between zero and a first threshold speed in the plurality of warning regions.

16. The method according to claim 15, wherein the coverage range of the detection unit remains constant when the vehicle speed is greater than the first threshold speed in a first warning region of the plurality of warning regions.

17. The method according to claim 16, wherein, when the vehicle speed is greater than the first threshold speed in a second warning region and a third warning region of the plurality of warning regions, the coverage range of the detection unit decreases as the vehicle speed increases.

\* \* \* \* \*